(12) United States Patent
Bristor

(10) Patent No.: US 6,908,122 B1
(45) Date of Patent: Jun. 21, 2005

(54) HOSE COUPLING DEVICE

(75) Inventor: Joe G. Bristor, Kent, WA (US)

(73) Assignee: Wanders Inc, Kent, WA (US)

( * ) Notice: Subject to any disclaimer, the term of this patent is extended or adjusted under 35 U.S.C. 154(b) by 0 days.

(21) Appl. No.: 10/389,895

(22) Filed: Mar. 17, 2003

(51) Int. Cl.$^7$ ............................................. F16L 25/00
(52) U.S. Cl. ......................................... 285/332; 285/7
(58) Field of Search .......................... 285/7, 31, 148.6, 285/148.19, 148.21, 390, 333, 372, 903, 285/148.22, 148.23, 417, 418, 328, 332, 285/332.1

(56) References Cited

U.S. PATENT DOCUMENTS

| | | | | |
|---|---|---|---|---|
| 176,796 A | * | 5/1876 | Martin | .................... 285/148.19 |
| 1,080,674 A | * | 12/1913 | Berg | ............................ 285/91 |
| 1,089,650 A | * | 3/1914 | Kile | .............................. 285/89 |
| 1,096,690 A | * | 5/1914 | Derbyshire | .................. 285/317 |
| 1,300,365 A | * | 4/1919 | Fletcher | ...................... 285/333 |
| 1,316,153 A | * | 9/1919 | Gagne | ......................... 285/308 |
| 1,386,210 A | * | 8/1921 | Thomas | ....................... 285/376 |
| 1,603,721 A | * | 10/1926 | Sorensen | ..................... 285/330 |
| 1,947,909 A | * | 2/1934 | Hollander | .................... 285/333 |
| 1,993,257 A | * | 3/1935 | Bettis | ......................... 285/333 |
| 2,107,716 A | * | 2/1938 | Singleton | ............... 285/148.19 |
| 2,205,697 A | * | 6/1940 | Scharpenberg | ............... 285/333 |
| 2,783,809 A | * | 3/1957 | Haines | ................... 285/148.19 |
| 3,336,054 A | * | 8/1967 | Blount et al. | ................ 285/333 |
| 4,625,998 A |   | 12/1986 | Draudt et al. | |
| 5,257,836 A |   | 11/1993 | Smith | |
| 5,407,236 A |   | 4/1995 | Schwarz et al. | |
| 6,070,912 A | * | 6/2000 | Latham | .................. 285/148.19 |

\* cited by examiner

Primary Examiner—Aaron Dunwoody
(74) Attorney, Agent, or Firm—Wanders Inc; Joe Bristor

(57) ABSTRACT

A coupling device (1) for releasably connecting tubular elongate members (4, 5) with improved efficiency. The coupling device (1) comprises first and second end piece connectors (2, 3) which are threadably secured or otherwise attached to connection ends (6, 7) of first and second tubular elongate members (4, 5). First and second end piece connectors (2, 3) are connected by rotating each end piece connector (2, 3) a minimal amount relative to each other, such that the rotation simultaneously locks end piece connectors (2, 3) together and engages mating tapers (31, 32) thus sealing the two end piece connectors (2, 3) and creating a leak proof seal. Coupling device (1) is just as easily disengaged, by rotating the two end piece connectors (2, 3) each in the opposite direction from engagement. In this way, the coupling device (1) provides a quick, easy and effective sealing mechanism especially useful to carpet cleaners who need to repeatedly connect and disconnect sections of vacuum hoses throughout their workday.

1 Claim, 2 Drawing Sheets

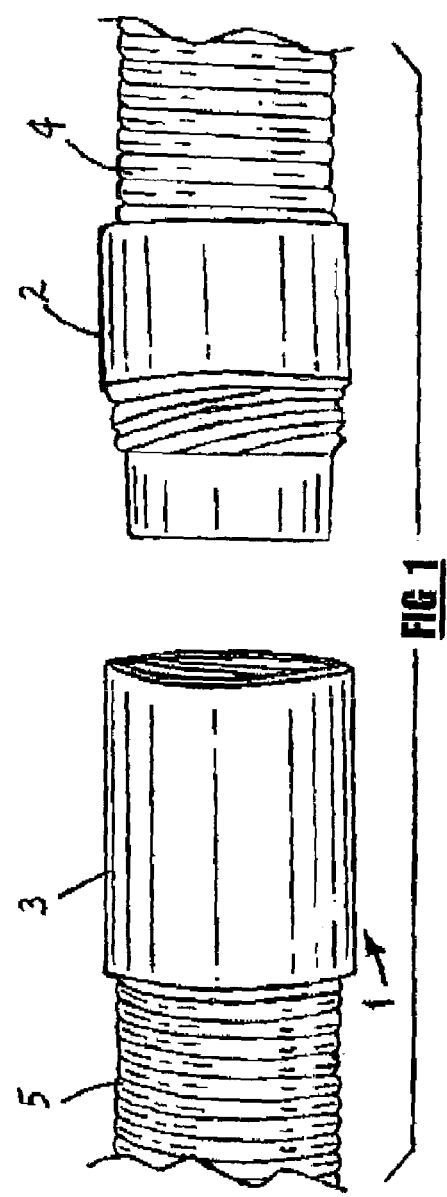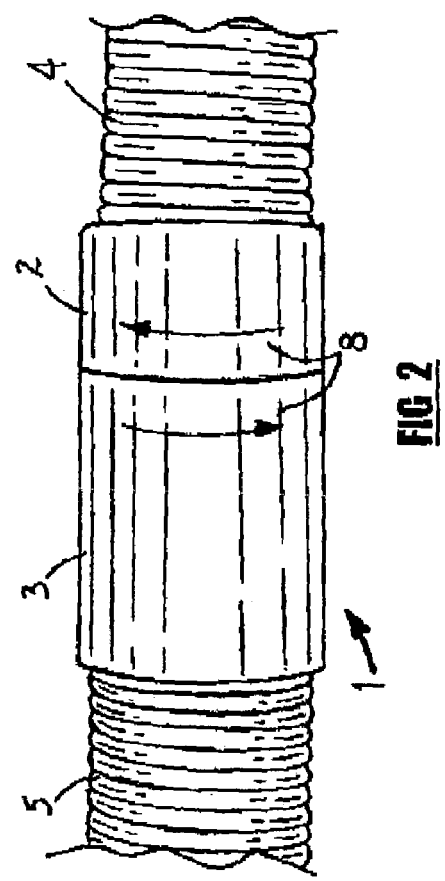

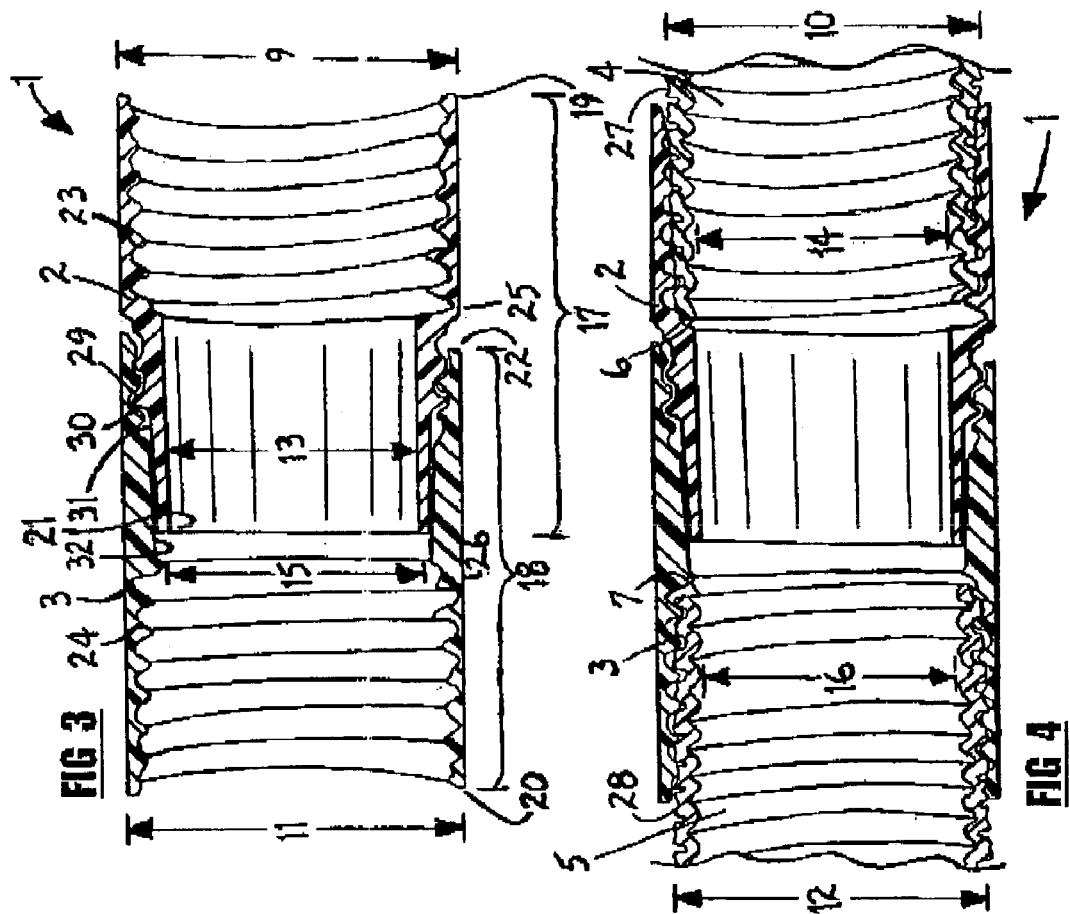

US 6,908,122 B1

HOSE COUPLING DEVICE

BACKGROUND OF THE INVENTION

1. Field of the Invention

This invention relates to hose couplers, and more particularly it relates to an improved vacuum hose coupling device and method of connecting hoses useful to carpet cleaners.

2. Description of Prior Art

Various coupling devices are known in the art.

U.S. Pat. No. 4,625,998 to Donald A. Draudt (1986) discloses a swivel hose 'end piece connector' but there is no locking, sealing, or release mechanism provided in association with the connection of two hoses. U.S. Pat. No. 5,257,836 to Peter J. Smith (1993) provides a quick and easy pipe coupling for field workers but it uses an 'elastomeric' sealing means of which are known in the art to degrade and leak over time, especially in the presence of water based chemicals commonly used in carpet cleaning. U.S. Pat. No. 5,407,236 to Ernst Schwartz, et al. (1995) discloses an innovative hose coupling which could be modified for use by carpet cleaners but the coupling can only be disengaged with the aid of an auxiliary tool.

For carpet cleaners, coupling devices for releasably connecting sections of vacuum hose have evolved from single insert to multi-component types. The three most common coupling devices in use by carpet cleaners are:

(1) Single insert coupler: comprising a symmetric tube body of about twice the length of the diameter of the hose being coupled is typically made of hardened plastic or metal with circumferential notches or barbs. The insert is 'wedged' into each hose end and the notches or barbs are meant to lock the coupler in place and thus hold the hoses together.

(2) Three-part coupler: two end piece connectors are each fixedly threaded onto each hose end, then an insert as described above is wedged into the free end of each end piece connector thus coupling the hoses.

(3) Four part coupler: the same two end piece connectors and insert are connected as described above, then a pair of straps straddle the coupling device and prevent it from being pulled apart.

There are numerous problems with these prior art couplings:

Single insert coupler: Vacuum hoses are typically made of hardened plastic with little elasticity and the insert is typically made of an even more rigid material; this makes for a physically trying experience wedging the insert into each hose end. During use, hot fluids and air passing thru the sections of hose cause differential swelling between the hose and insert and this swelling can result in leakage of air and fluid around the hose end and insert. Eventually, this coupling device fails as the swelling becomes so extreme that the insert slips out of the hose end and may even never to seal properly again. Another problem with 'insert' couplings is that since the insert is of smaller inner diameter ("ID") than that of the hose itself, flow is restricted. Strands of hair and other debris accumulate at these restrictions over time and create a physical blockage in the hose. The jagged hose ends being fully exposed, detract from the appearance of this coupling device.

Three part coupler: The two end piece connectors hide the jagged hose ends and thus improve the appearance of the coupler plus the two end pieces connectors provide a more secure attachment to the hose ends by means of threads along their interior surface whereby each end piece connector engages circumferential grooves along the perimeter surface of its respective hose end. Unfortunately, the same insert as described above is typically used to couple the two end pieces connectors and this weak connection allows this coupling device to pull apart under tension just like the single insert coupling device. Plus, the insert restricts flow, and accumulates debris. Manufacturers seem to have added parts, expense, and complexity yet still have not solved the problems—flow restriction, leakage, and hose separation.

Four part coupler: This style of coupling device solves the 'separation' problem by using two straps that are secured to vacuum hose beyond the coupler itself then buckled together. However, these straps add girth to the hose causing it to 'hang-up' on obstacles along its path. The straps also add complexity, labor, parts, and expense. And the insert is still required, so leakage still occurs; especially as the hoses heat and swell with age. Even with the straps, the insert still restricts flow and collects debris.

With the advancements in the art, it seems that coupling devices have become:

(i) more complex in design,
(ii) more difficult to use,
(iii) more expensive, and
(iv) less streamlined.

And they still haven't solved the two main functional problems of:

(v) leakage, and
(vi) flow restriction.

BRIEF SUMMARY OF INVENTION

It is an object of the present invention to solve the above identified problems by providing a simpler and more functional coupling device. Accordingly, several objects and advantages of the invention are to disclose a coupler which is:

(i) simple in design
(ii) easy to use
(iii) inexpensive, and
(iv) streamlined and attractive The proposed coupling device also solves the two main functional problems by providing an:

(v) an effective sealing mechanism which won't swell or leak with age, and
(vi) less flow restriction through the coupling device.

A new and improved coupling device and method of engagement and disengagement is disclosed for coupling various tubular elongate members with improved efficiency.

BRIEF DESCRIPTION OF THE DRAWINGS

The present invention may be more readily described by reference to the accompanying drawings in which:

FIG. 1 is a perspective view of coupling device ready to connect two sections of hose.

FIG. 2 is a perspective view of two sections of hose coupled.

FIG. 3 is a cross-sectional view of the two end piece connectors coupled.

FIG. 4 is a cross-sectional view of the two hose ends coupled by means of coupling device.

REFERENCE NUMERALS IN DRAWINGS

Coupling device 1
First end piece connector 2
Second end piece connector 3
First tubular elongate member 4

Second tubular elongate member 5
Connection end of first tubular elongate member 6
Connection end of second tubular elongate member 7
Arrow of rotation 8
OD of first end piece connector 9
OD of first tubular elongate member 10
OD of second end piece connector 11
OD of second tubular elongate member 12
ID of first end piece connector 13
ID of first tubular elongate member 14
ID of second end piece connector 15
ID of second tubular elongate member 16
Length of first end piece connector 17
Length of second end piece connector 18
First end of first end piece connector 19
First end of second end piece connector 20
Second end of first end piece connector 21
Second end of second end piece connector 22
End piece threads of first end piece connector 23
End piece threads of second end piece connector 24
Midpoint of first end piece connector 25
Midpoint of second end piece connector 26
Circumferential grooves of first tubular elongate member 27
Circumferential grooves of second tubular elongate member 28
Coupling threads of first end piece connector 29
Coupling threads of second end piece connector 30
Tapered surface of first end piece connector 31
Tapered surface of second end piece connector 32

DETAILED DESCRIPTION

Referring more particularly to the drawings by characters of reference, FIGS. 1 & 2 disclose the preferred embodiment of the coupling device 1 of the present invention.

FIG. 1 shows first and second end piece connectors 2, 3 having the general form of thick-walled sections of tubing threadably engaged to first and second tubular elongate members 4, 5 respectively.

FIG. 2 shows the two sections of vacuum hoses coupled by means of the coupling device 1 of the present invention. This coupling is accomplished by means of a simple rotation of the two end piece connectors in the direction of the arrows 8; in the case of the preferred embodiment, clockwise.

FIG. 3 shows first and second end piece connectors 2, and 3 comprising outer diameters ("OD") 9 and 11, inner diameters ("ID") 13 and 15, lengths 17 and 18, first ends 19 and 20, and second ends 21 and 22, respectively.

In the preferred embodiment, end piece threads 23 and 24 line the interior surface of each end piece connector 2, 3 respectively and extend along the lengths 17, 18 of end piece connector 2, 3 respectively from their ends 19, 20 to their midpoints 25, 26, respectively.

Coupling threads 29, line the exterior surface of first end piece connector 2 and extend along the length 17 from about midpoint 25 to about three fourths of the distance from first end 19 to second end 21. Coupling threads 30 line the interior surface of second end piece connector 3 and extend along the length 18 from about three fourths of the distance from first end 20 to second end 22 to about the second end 22 of end piece connector 3. As shown in FIG. 3, coupling threads 29, 30 serve to lock end piece connector 2 and 3 together respectively, forming the coupled device 1 of the present invention.

Tapered surface 31 of first end piece connector 2, lines the exterior surface forming the approximate final quarter of the length 17, extending from about three fourths of the distance from first end 19 to second end 21 of end piece connector 2.

Tapered surface 32 of second end piece connector 3, lines the interior surface extending along the length 18 from about three fourths of the distance from first end 20 to second end 22 of end piece connector 3.

As shown in FIG. 3, tapers 31, 32 serve to seal end piece connector 2 against end piece connector 3 respectively as coupling threads 29, 30 of end piece connector 2, 3 are engaged, thus forming a leak proof seal for the coupling device 1 of the present invention. Even with the coupling threads 29, 30 not completely threaded, FIG. 3 shows the seal along tapers 31, 32 to still be in effect.

FIG. 4 shows first and second tubular elongate members 4 and 5 having the general form of sections of vacuum hoses comprising connection ends 6 and 7, OD 10 and 12, ID 14 and 16, and circumferential grooves 27 and 28, respectively.

In the preferred embodiment, end piece threads 23, 24 (FIG. 3) of first and second end piece connectors 2, 3 respectively mate the circumferential grooves 27, 28 along the perimeter surfaces of respective first and second tubular elongate members 4, 5 and provide a secure engagement between respective first and second tubular elongate members 4, 5. Alternatively, the end piece threads 23 and 24 could be omitted and replaced with smooth walls sized to that of the OD of tubular elongate members 4, 5. This would allow end piece connectors 2, 3 to be fixedly glued to perimeter surface of each tubular elongate members 4, 5.

FIG. 4 also shows that the narrowest ID of the coupling itself is not narrower than the IDs 14, 16 of the tubular elongate members 4, 5 themselves, thus there is no restriction of flow through the coupling device 1 of the present invention.

From the above description, a number of advantages of my coupling device 1 become evident:

simple in design: As explained herein, the coupling device 1 of the present invention provides a simple and efficient design that utilizes only two parts—the first and second end piece connectors 2, 3. There's no straps, inserts, tools or accessories needed for operation, and no seals to replace.

easy to use: Since there are no straps or buckles, there is less chance of hanging up on obstacles along the path of vacuum hose like steps, curbs, and corners. And since there's less likelihood of hose separation, then there's no aggravating and tiring 'wedging,' during the job.

inexpensive: My prototype end piece connectors 2,3 were machined from rugged stock irrigation tubing (source: Superion, Tacoma Wash.). They could also be injected molded from rugged any of several plastics such that price is comparable to existing coupling devices presently available.

streamlined and attractive. There's no bulky straps and less girth than the couplers presently available.

Functionally;

an effective sealing mechanism: Rather than inserts or elastomeric seals, coupling threads 29, 30 are used to interlock end piece connectors 2, 3. The combination of coupling threads 29, 30 plus tapers 31, 32 provide a reliable, leak proof seal effective even when the coupling threads 29, 30 are only partially engaged as is the case in FIGS. 3 & 4. Surprisingly, the seal actually improves with exposure to the heated fluids typical of carpet cleaning solutions. The heat acts to help swell and seat the tapered seals and the vacuum helps to naturally draw the two end piece connectors 2, 3 closer together. The seal thus created along tapers 31, 32 of end piece connectors 2, 3 is further protected by the fact that end piece connector 3 envelopes the tapers 31, 32 and protects them from damage under normal working conditions.

less flow restriction: Since the narrowest ID 13, 15 of the coupling device 1 is no less than the IDs 14, 16 of the tubular elongate members 4, 5, there is no narrowing through the coupling device 1 thus there is little or no flow restriction imposed by the coupling device 1. Additionally, there are no projections to snag particulate as it passes through the coupling device 1.

Operation:

User of coupling device 1 determines the correct end piece connectors 2, 3 to match the chosen tubular elongate members 4, 5. In the case of carpet cleaning, vacuum hoses are typically used which have semi-rigid circumferential grooves 27, 28 (FIG. 4) along their perimeter surfaces which mate well with the end piece threads 23, 24 of coupling device 1 of the present invention. A glue or silicone sealant may be used to fixedly secure the connection between circumferential grooves 27, 28 of tubular elongate members 4, 5 to mating end piece threads 23, 24 of end piece connectors 2, 3, respectively although sealant is not necessary for operation. Alternatively, end piece connectors 2, 3 could be chosen which have no end piece threads 23, 24, rather, they could be sized to fit the outer diameter of the tubular elongate members 4, 5 whereby they could be fixedly glued in place.

To engage the coupling device 1 of the present invention, the user simultaneously grasps end piece connector 2 in one hand between its midpoints 25 and first end 19 and grasps end piece connector 3 in the other hand between its midpoint 26 and its first end 20 then aligns tapered surface 31 of end piece connector 2 with mating tapered surface 32 of end piece connector 3. Having thus contacted mating threads of each body, the user then simply rotates both end piece connectors 2, 3 in opposite directions relative to each other, in the case of the preferred embodiment, clockwise relative to each other as shown in (FIG. 2) a minimal amount, typically about one-quarter of a revolution. Such rotation provides a simultaneous securement along the coupling threads 29, 30 of end piece connectors 2, 3 and a sealing engagement along the mating tapers 31, 32 respectively. Thus with a simple rotation, the two sections of vacuum hoses are coupled and sealed.

To disengage the coupling device 1, the user simply grasps each end piece connectors 2, 3 as described above and rotates both end piece connectors 2, 3 in opposite directions, the direction or rotation being opposite that required for securement, in the case of the preferred embodiment, approximately one-quarter of a revolution counterclockwise, thus disengaging the two end piece connectors 2, 3 of coupling device 1.

CONCLUSION, RAMIFICATIONS, SCOPE

Variously sized and shaped end piece connectors 2, 3 can be specifically manufactured or modified to fit various sized tubular elongate member 4, 5 in accordance with the coupling device 1 of the present invention. First and second end piece connectors 2, 3 may be threadably secured or the endpiece threads 23, 24 may be omitted and end piece connectors 2, 3 may be fixedly glued or otherwise secured to the outer surface of connection ends 6, 7 of first and second tubular elongate members 4, 5. The relative shapes, lengths, styles, thread directions, and positioning of the coupling threads 29, 30 and tapers 31, 32 may be rearranged or reversed without effecting the essence of the 'thread and taper' engagement of the coupling device 1 without changing the scope of the invention.

The preceding specific embodiments are illustrative of the practice of the invention. It is to be understood, however, that other expedients known to those skilled in the art or disclosed herein, may be employed without departing from the spirit of the invention or the scope of the appended claims.

I claim:

1. A coupling device for a vacuum cleaner, the device comprising:

a first and second end piece connectors releasably coupled to one another;

means fixedly connecting the first and the second end piece connectors to a pair of connection ends of first and second tubular elongated members, each of the end piece connectors have end piece threads extending along the lengths of their interior surfaces from about a respective first end of each of the end piece connectors to about an axial midpoint of each of the end piece connectors, and each of said end piece threads mates with circumferential grooves along an exterior surface of each respective said tubular elongated member such that the end piece connectors may be fixedly threaded onto the tubular elongated members;

means of releasably coupling the first and second end piece connectors, the first end piece connector has a coupling thread located circumferentially around its exterior surface from about an axial midpoint of the first end piece connector to an axial point about three fourths of the distance from said first end of the first end piece connector, the second end piece connector has a coupling thread located circumferentially along its interior surface from a point about three fourths of the distance from said first end of the second end piece connector to about a second end of the second end piece connector which mates with the coupling thread of the first end piece connector; and means of sealing the first and second end piece connectors, the first end piece connector has a smooth tapered surface extending axially along its exterior surface from a point about three fourths of the distance from the first end to about a second end of the first end piece connector, the second end piece connector has a smooth tapered surface extending axially along its interior surface from about said midpoint of the second end piece to a point about three fourths of the distance from the first end and mates with said tapered surface of the first end piece connector providing a releasable sealing engagement between the tapered surface and providing a leakproof connection for the tubular elongated members.

* * * * *